US012749811B2

(12) United States Patent
Bhattacharya et al.

(10) Patent No.: US 12,749,811 B2
(45) Date of Patent: Sep. 29, 2026

(54) CALIBRATION OF TIMING AND PHASE ALIGNMENT FOR HYBRID BEAMFORMER

(71) Applicant: QUALCOMM Incorporated, San Diego, CA (US)

(72) Inventors: Anushruti Bhattacharya, San Diego, CA (US); Mark Wallace, Bedford, MA (US); Alexander Sverdlov, Rehovot (IL); Kyung Hwan Kim, Oceanside, CA (US); Revathi Sundara Raghavan, San Diego, CA (US); Christian Oliver Thelen, San Diego, CA (US); Donald Gosnell, Escondido, CA (US); Shrenik Patel, San Diego, CA (US); Igor Gutman, Hod HaSharon (IL); Kyle Alexander Douglas, San Diego, CA (US); Carl Hardin, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 18/894,123

(22) Filed: Sep. 24, 2024

(65) Prior Publication Data

US 2026/0088499 A1 Mar. 26, 2026

(51) Int. Cl.
*H01Q 3/26* (2006.01)
*H01Q 3/36* (2006.01)
*H01Q 23/00* (2006.01)

(52) U.S. Cl.
CPC ............... *H01Q 3/36* (2013.01); *H01Q 23/00* (2013.01)

(58) Field of Classification Search
CPC ............ H01Q 3/26; H01Q 3/36; H01Q 21/00; H01Q 21/06; H01Q 23/00
See application file for complete search history.

(56) References Cited

U.S. PATENT DOCUMENTS 8,203,483 B2 * 6/2012 Richards .............. H01Q 3/2605 342/368
10,263,330 B2 * 4/2019 Martikkala ............ H01Q 21/00
(Continued)

FOREIGN PATENT DOCUMENTS

CN 102544760 A * 7/2012 ............... H01Q 3/36

OTHER PUBLICATIONS

Partial International Search Report—PCT/US2025/043890—ISA/EPO—Dec. 5, 2025.
(Continued)

*Primary Examiner* — Tho G Phan
(74) *Attorney, Agent, or Firm* — Patterson & Sheridan LLP/ Qualcomm

(57) ABSTRACT

Techniques and apparatus for wireless communication are provided. An example method generally includes: transmitting at least one transmit waveform via at least one transmit antenna; receiving a first receive waveform via a first receive antenna; receiving a second receive waveform via a second receive antenna, the first receive waveform and the second receive waveform corresponding to the at least one transmit waveform; determining at least one tuning parameter based on the first received waveform and the second received waveform, wherein the at least one tuning parameter is associated with at least one of a phase difference or a time delay between the first received waveform and the second received waveform; and configuring at least one of a phase adjustment element or a timing adjustment element of a transmit chain coupled to each of the at least one transmit antenna based on the at least one tuning parameter.

17 Claims, 15 Drawing Sheets

(56) References Cited

U.S. PATENT DOCUMENTS

| | | | | |
|---|---|---|---|---|
| 11,329,376 | B2 * | 5/2022 | Hsu | H01Q 3/267 |
| 12,027,775 | B2 * | 7/2024 | Cheng | H01Q 1/48 |
| 12,381,315 | B1 * | 8/2025 | Yetisir | H01Q 9/0457 |
| 2011/0006949 | A1 | 1/2011 | Webb | |
| 2017/0346575 | A1 | 11/2017 | Tang et al. | |
| 2022/0149517 | A1 | 5/2022 | Carlsson et al. | |

OTHER PUBLICATIONS

International Search Report and Written Opinion—PCT/US2025/043890—ISA/EPO—Mar. 24, 2026.

* cited by examiner

CALIBRATION OF TIMING AND PHASE ALIGNMENT FOR HYBRID BEAMFORMER

BACKGROUND

Field of the Disclosure

Aspects of the present disclosure relate to wireless communications, and more particularly, to techniques for beamforming calibration.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like.

SUMMARY

Certain aspects of the present disclosure are directed towards a method for wireless communication. The method generally includes: transmitting at least one transmit waveform via at least one transmit antenna; receiving a first receive waveform via a first receive antenna; receiving a second receive waveform via a second receive antenna, the first receive waveform and the second receive waveform corresponding to the at least one transmit waveform; determining at least one tuning parameter based on the first received waveform and the second received waveform, wherein the at least one tuning parameter is associated with at least one of a phase difference or a time delay between the first received waveform and the second received waveform; and configuring at least one of a phase adjustment element or a timing adjustment element of a transmit chain coupled to each of the at least one transmit antenna based on the at least one tuning parameter.

Certain aspects of the present disclosure are directed towards an apparatus for wireless communication. The apparatus generally includes a memory and one or more processors coupled to the memory and configured to: cause transmission of at least one transmit waveform via at least one transmit antenna; cause reception of a first receive waveform via a first receive antenna; cause reception of a second receive waveform via a second receive antenna, the first receive waveform and the second receive waveform corresponding to the at least one transmit waveform; determine at least one tuning parameter based on the first received waveform and the second received waveform, wherein the at least one tuning parameter is associated with at least one of a phase difference or a time delay between the first received waveform and the second received waveform; and configure at least one of a phase adjustment element or a timing adjustment element of a transmit chain coupled to each of the at least one transmit antenna based on the at least one tuning parameter.

Certain aspects of the present disclosure are directed towards a non-transitory computer-readable medium having instructions stored thereon, that when executed by one or more processors, cause the one or more processors to: cause transmission of at least one transmit waveform via at least one transmit antenna; cause reception of a first receive waveform via a first receive antenna; cause reception of a second receive waveform via a second receive antenna, the first receive waveform and the second receive waveform corresponding to the at least one transmit waveform; determine at least one tuning parameter based on the first received waveform and the second received waveform, wherein the at least one tuning parameter is associated with at least one of a phase difference or a time delay between the first received waveform and the second received waveform; and configure at least one of a phase adjustment element or a timing adjustment element of a transmit chain coupled to each of the at least one transmit antenna based on the at least one tuning parameter.

Other aspects provide: an apparatus operable, configured, or otherwise adapted to perform any one or more of the aforementioned methods and/or those described elsewhere herein; a non-transitory, computer-readable media comprising instructions that, when executed (e.g., directly, indirectly, after pre-processing, without pre-processing) by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Certain aspects are directed towards self-calibration (e.g., without using external equipment) of timing and phase alignments for beamforming. For instance, some aspects are directed towards calibrating a hybrid beamformer. Hybrid beamformers use processing in both digital and analog domains to create beamformed signals. Certain aspects of the present disclosure are directed towards a device having multiple arrays associated with respective integrated circuits (ICs) for beamforming. The arrays may be packaged in a module (e.g., optionally along with other elements such as radio frequency (RF) circuitry). An antenna in each of the multiple arrays may be configured to transmit a calibration waveform (e.g., also referred to herein as a "transmit waveform"), and a receive antenna in each array may be configured to receive the transmitted waveforms from the arrays. The transmit waveform as received by an antenna may be referred to herein as a "receive waveform." The receive waveforms may be used to determine and correct for (or at least reduce) phase and timing offsets between the arrays (e.g., between the antennas of the arrays), thereby enabling a narrower beam and reducing the usage of expensive equipment involved with factory calibration.

Introduction to Wireless Communications Networks

The techniques and methods described herein may be used for various wireless communications networks. While aspects may be described herein using terminology commonly associated with Third Generation (3G), Fourth Generation (4G), and/or Fifth Generation (5G) wireless technologies, aspects of the present disclosure may likewise be applicable to other communications systems and standards not explicitly mentioned herein.

Figure 1:
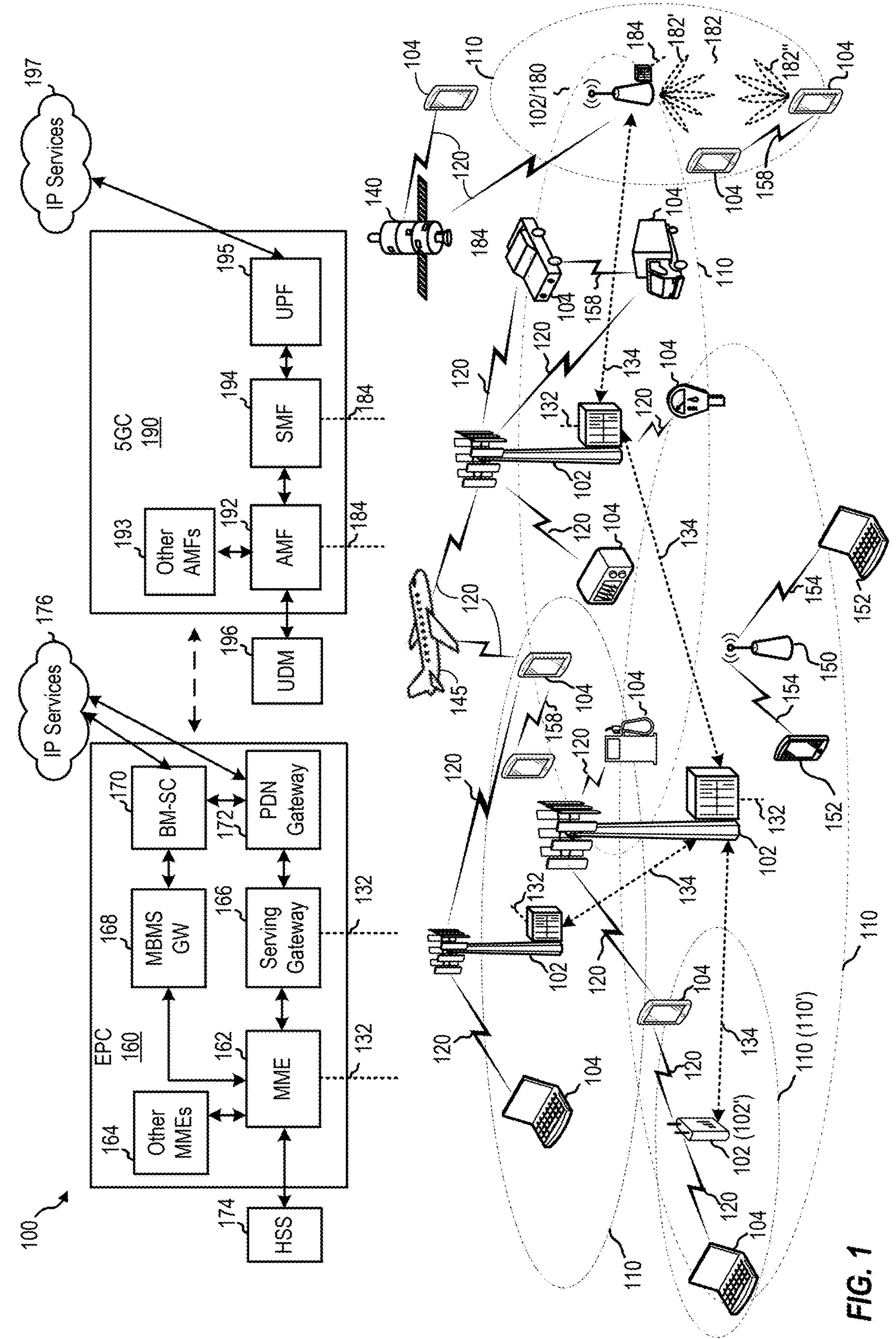
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point (AP), base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
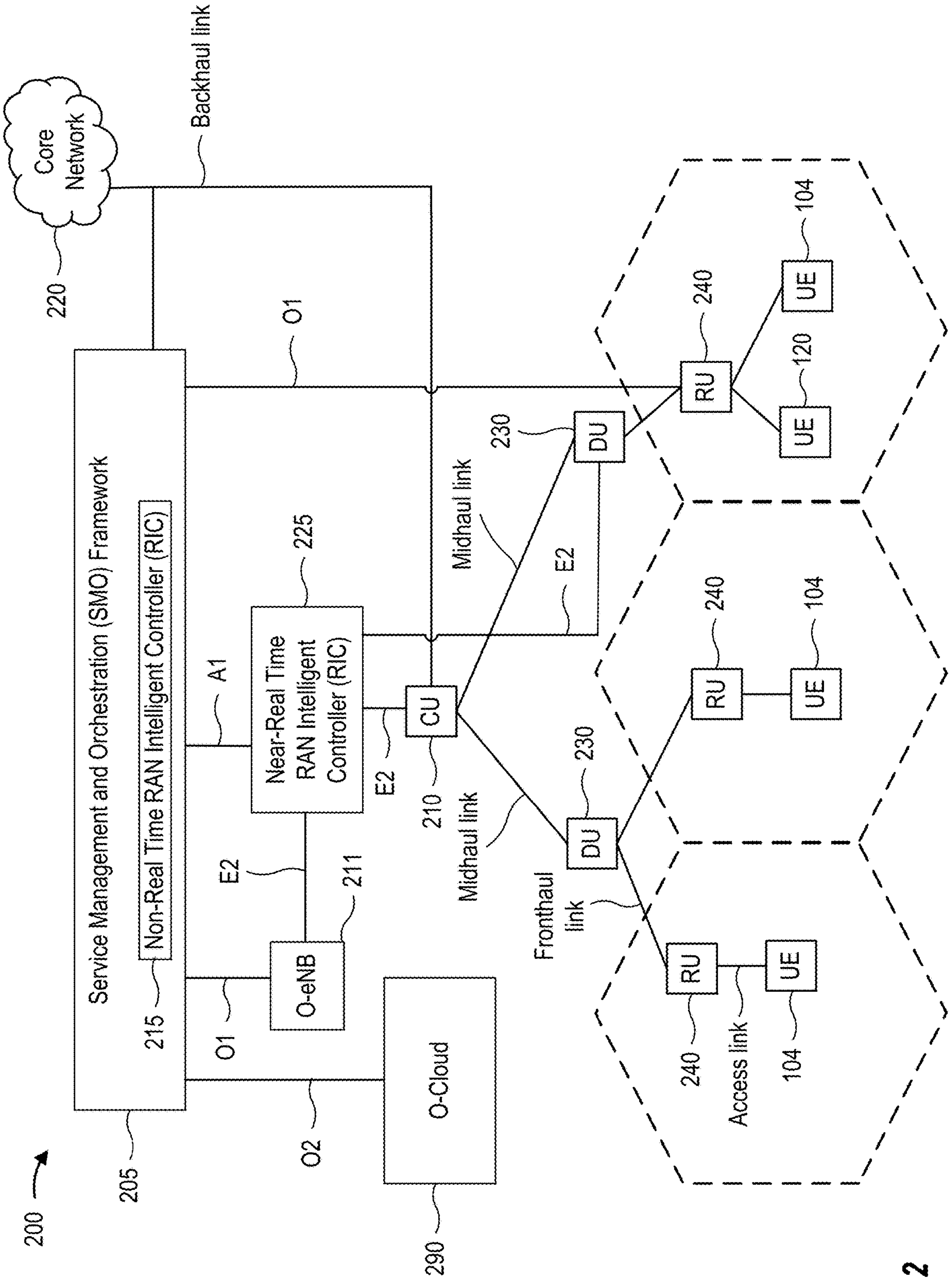
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G New Radio (NR) or Next Generation RAN (NG-RAN)) may interface with 5GC 190 through second backhaul links 184. BSs 102 may communicate directly or indirectly (e.g., through the EPC 160 or 5GC network 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, the 3rd Generation Partnership Project (3GPP) currently defines Frequency Range 1 (FR1) as including 410 MHz-7125 MHz, which is often referred to (interchangeably) as "Sub-6 GHz." Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., beamforming 182) with a UE (e.g., UE 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same. Antenna arrays of a BS 180 or UE 104 for beamforming may be calibrated using waveforms including estimation and verification tones, as described in more detail herein.

Wireless communications network 100 further includes a Wi-Fi access point (AP) 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting MBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC network 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a VRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
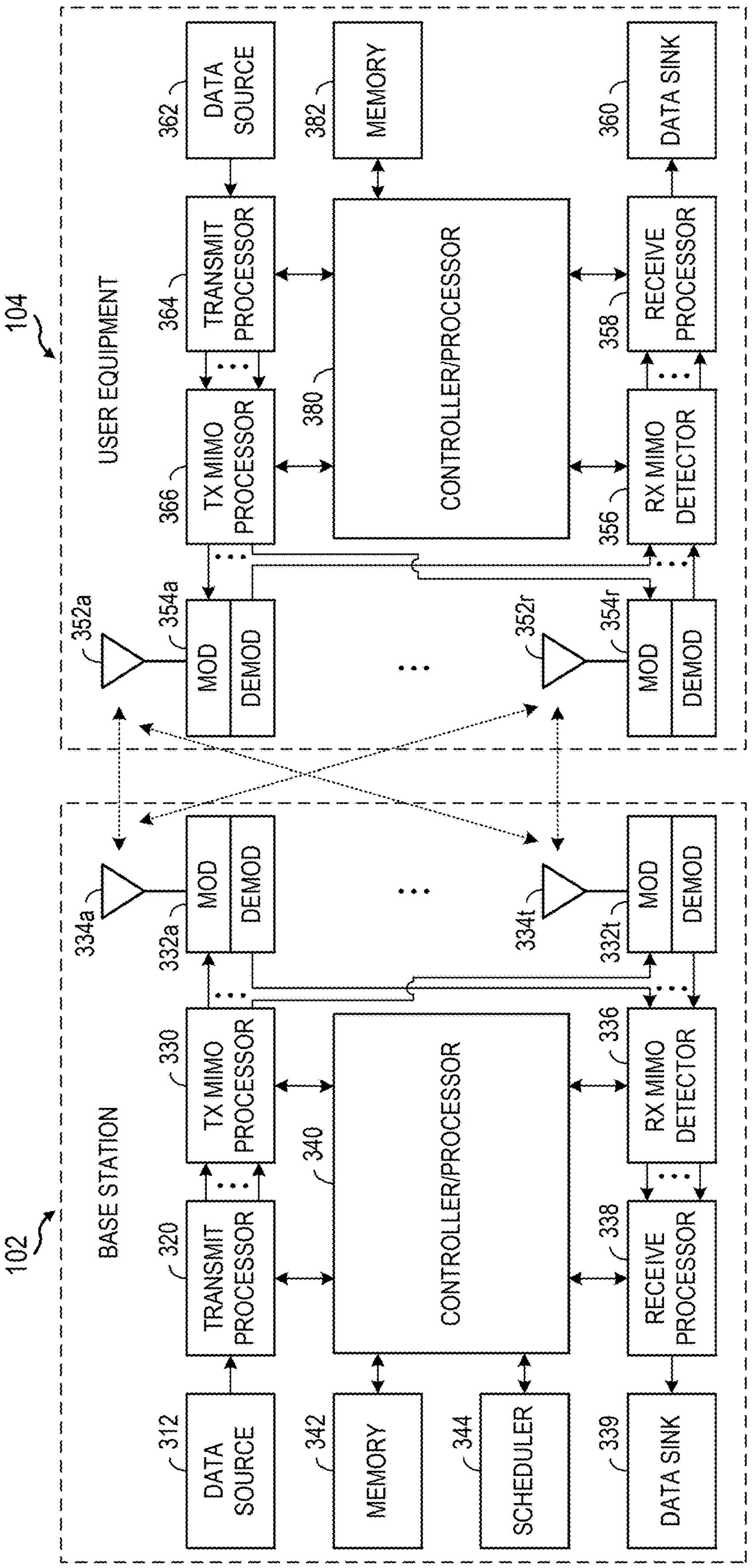
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the physical uplink shared channel (PUSCH)) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, receive (RX) MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data. In some cases, the transceiver 332 or transceiver 354 may operate antenna arrays for beamforming that may be calibrated using waveforms including estimation and verification tones, as described in more detail herein.

FIGS. 4A, 4B, 4C, and 4D depict aspects of data structures for a wireless communications network, such as wireless communications network 100 of FIG. 1.

Figure 4B:
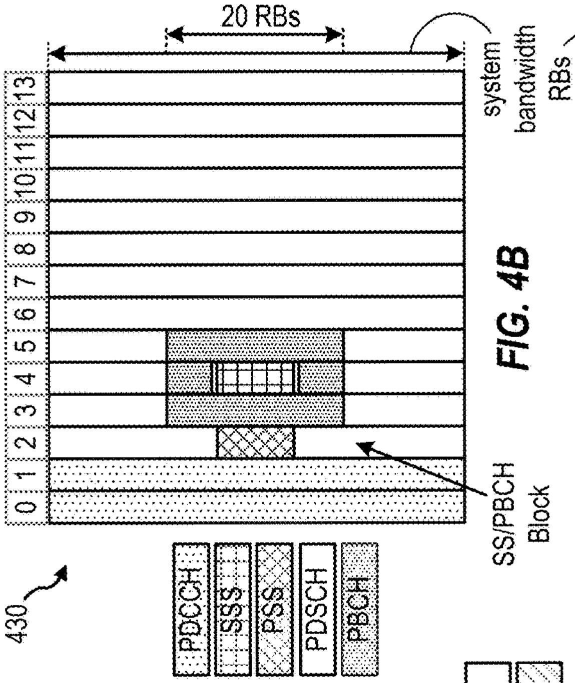
FIGS. 4A, 4B, 4C, and 4D depict various example aspects of data structures for a wireless communications network.
Figure 4A:
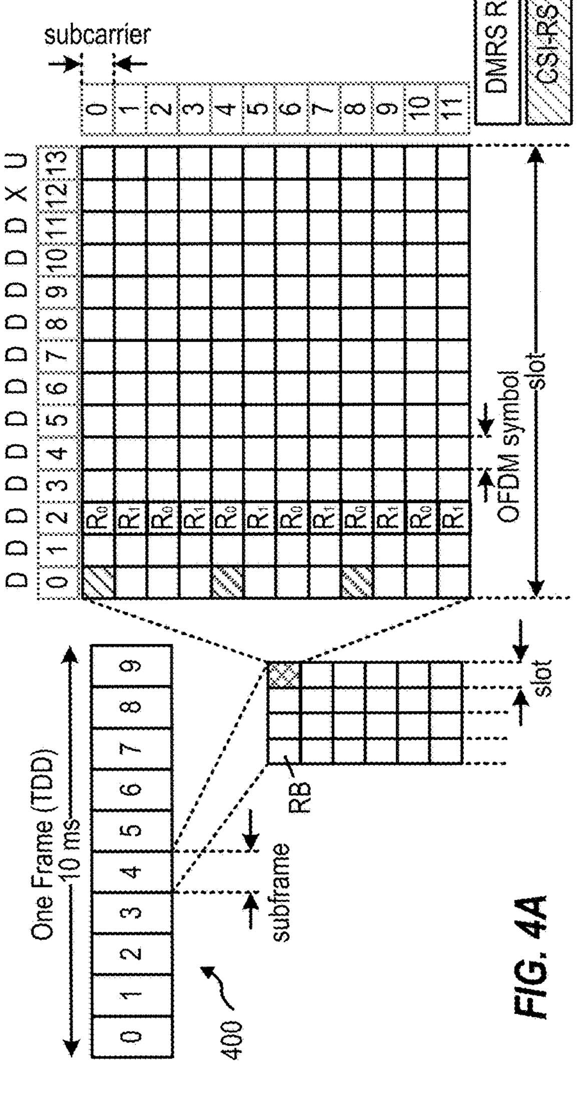
Figure 4D:
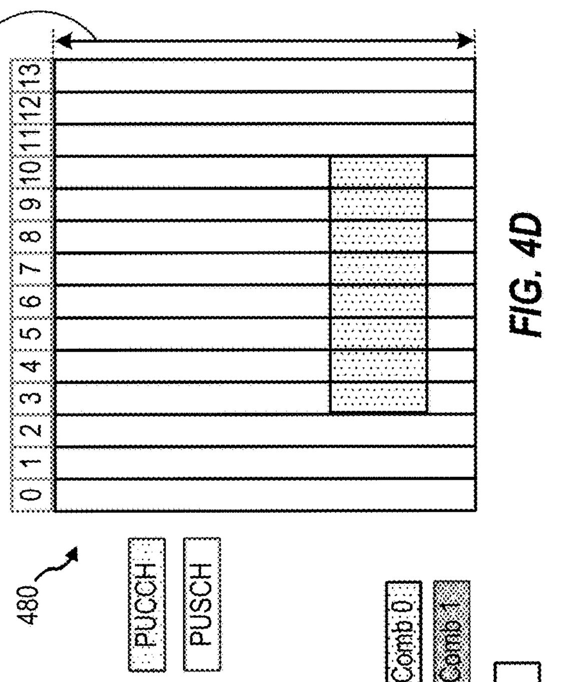
Figure 4C:
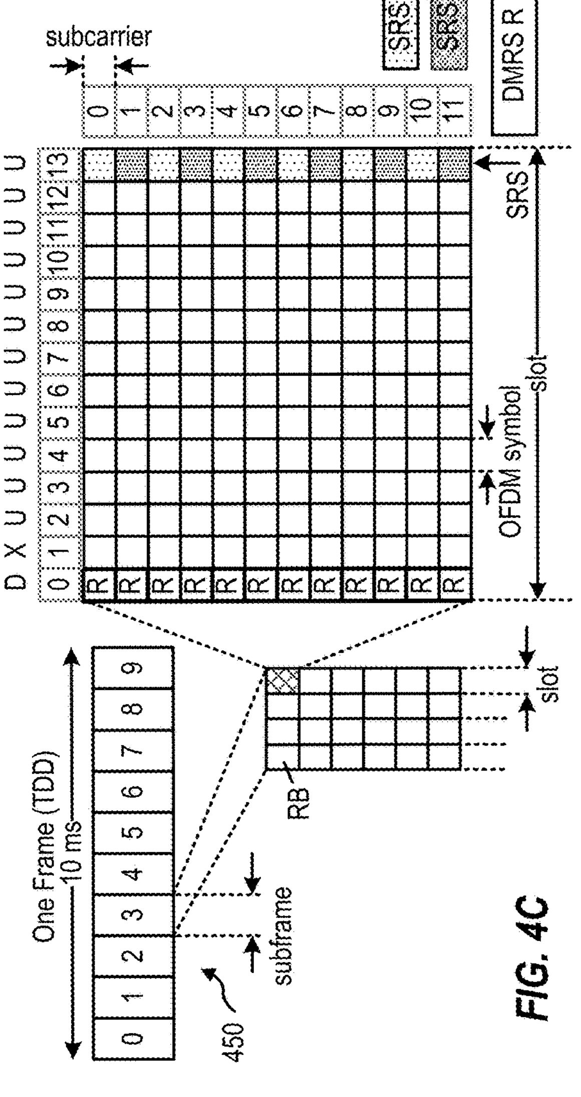

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and 2$\mu$ slots/subframe. The subcarrier spacing and symbol length/duration are a function of the numerology. The subcarrier spacing may be equal to 24× 15 kHz, where $\mu$ is the numerology 0 to 5. As such, the numerology $\mu$=0 has a subcarrier spacing of 15 kHz and the numerology $\mu$=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., UE 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ acknowledgment (ACK)/NACK (negative acknowledgement) feedback. The PUSCH carries data, and may additionally be used to carry a buffer status report (BSR), a power headroom report (PHR), and/or UCI.

Aspects Related to Calibration of Antenna Arrays

Hybrid beamformers include several digital chains serving analog beamformers that may be synchronized to create beams and improve receive signal-to-noise ratio (SNR) and transmit power. Many beamforming arrays are calibrated in a factory using a large far-field anechoic chamber and expensive external equipment to align phase and group delay between digital chains.

Figure 5:
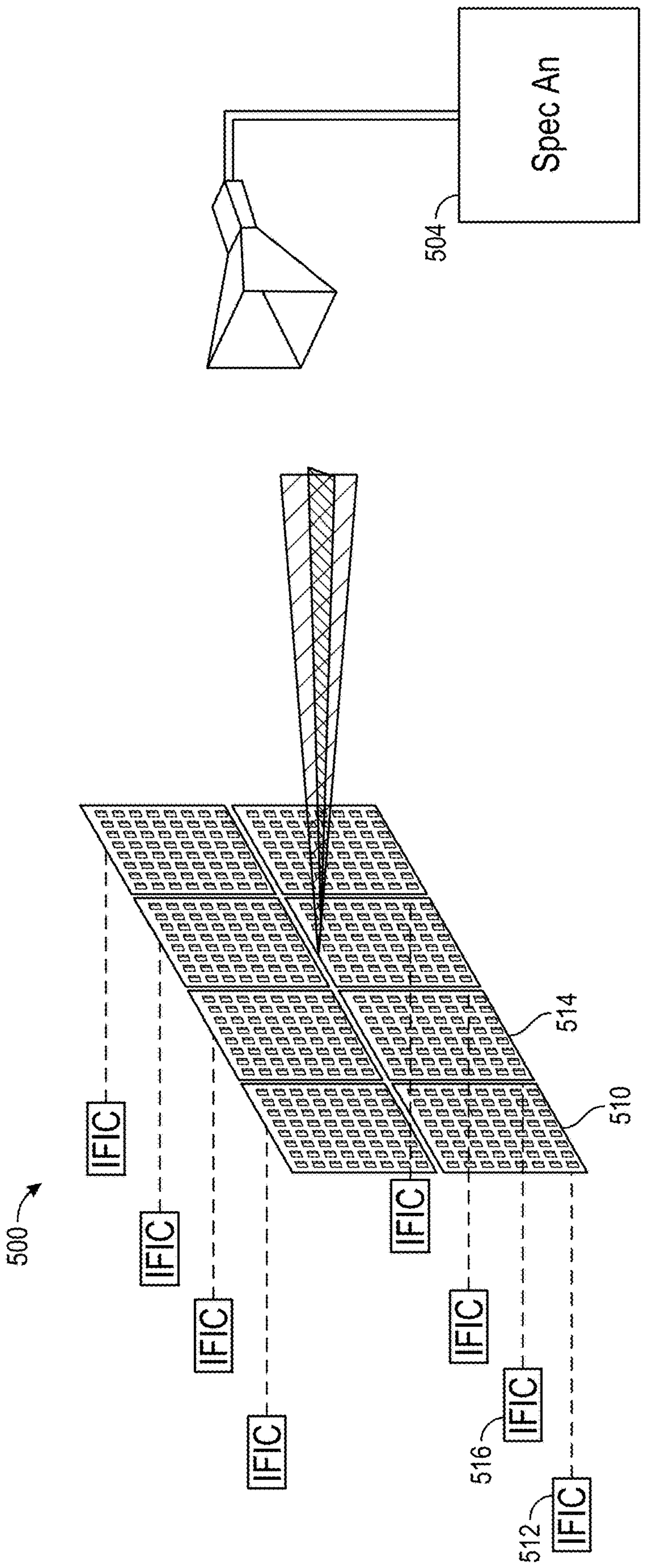
FIG. 5 illustrates a communication circuit including beamforming antenna arrays.

FIG. 5 illustrates a communication circuit 500 including beamforming antenna arrays. The communication circuit 500 may be disposed within an anechoic chamber for calibration using a spectral analyzer 504 (labeled "Spec An"). As shown, the communication circuit 500 may include multiple antenna arrays (e.g., such as antenna arrays 510, 514, also referred to herein as "arrays"), each including an array of antennas. Each array may be controlled by a transceiver integrated circuit (IC) including a digital-to-analog converter (DAC). For example, the transceiver IC may include an intermediate frequency transceiver IC (IFIC) that may convert a baseband signal to an intermediate frequency (IF) signal. In some cases, radio frequency (RF) circuitry may be used to upconvert the IF signal to an RF signal for transmission using a respective antenna array. The RF circuitry may also include phase shifters to implement beamforming operations. The RF circuitry may be part of the transceiver IC or may be implemented separately. In some examples, the RF circuitry is packaged together with an antenna array in a module. In other examples, the RF circuitry is separated from the antenna arrays (e.g., not in a common package or module). The RF circuitry may be included in an RF IC, and there may be one RF IC per antenna array or multiple RF ICs per antenna array. The DAC may receive a digital signal processed via a digital chain and convert the digital signal to an analog signal for transmission via the antennas of the associated array. For instance, transceiver 512 may drive the array 510 for beamformed transmission, and transceiver 516 may drive the array 514 for beamformed transmission. The calibration may be performed in an anechoic chamber, as described. Using signal measurements by a spectral analyzer 504, the beam associated with the antenna arrays may be calibrated (e.g., calibrated to focus the beam from the communication circuit 500).

Wideband signals are especially prone to misalignment in group delay that can create nulls over a given bandwidth (e.g., a component carrier (CC)). That is, the delay between groups of antennas or arrays (e.g., referred to as group delay or time delay) may be misaligned (e.g., the delay associated with driving signals to the arrays using the associated transceiver ICs may be misaligned). Additional circuits may be used to preserve the phase and group alignment each time a wireless device is booted up. Complex routing or digital circuitry may sometimes be used to time-align samples. For instance, the IFICs for the different antenna arrays may include circuitry to align the timing between the signals generated by the IFICs.

Figure 6:
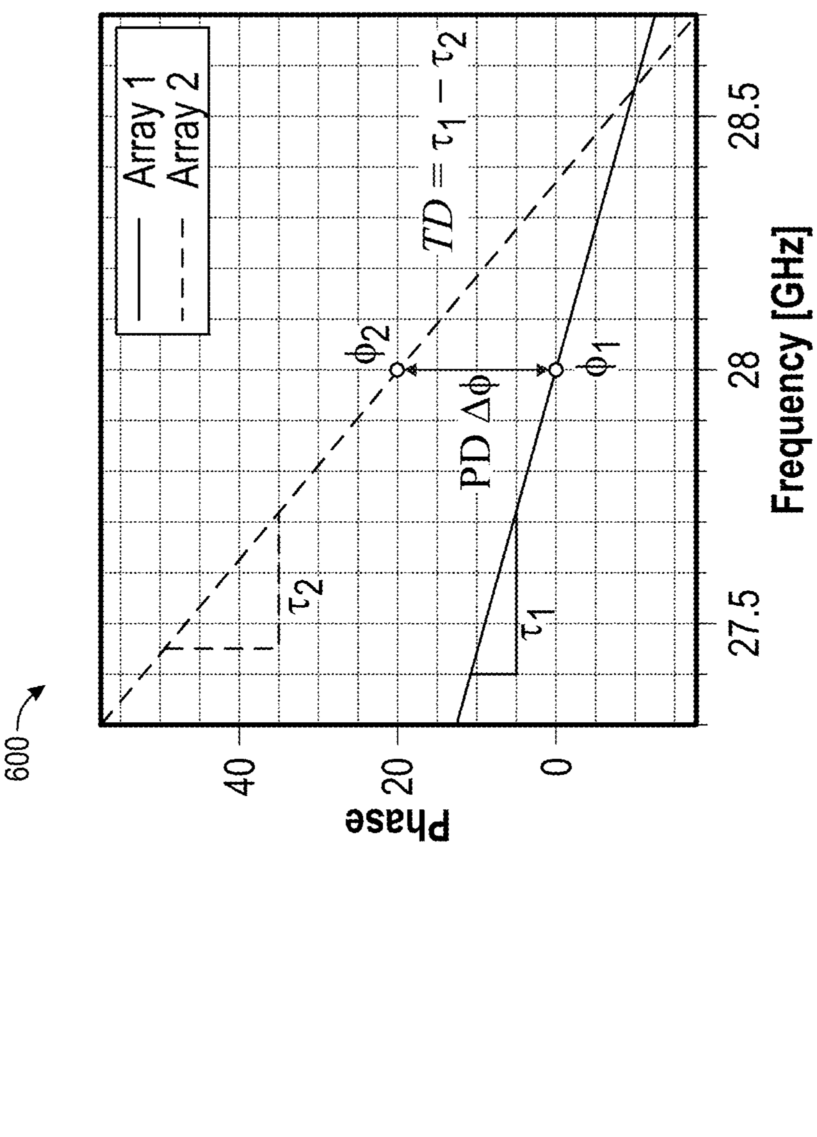
FIG. 6 is a graph illustrating time delay (TD) and phase delay (PD) between two antenna arrays.

FIG. 6 is a graph 600 illustrating time delay (TD) and phase delay (PD) (e.g., also referred to as a "phase difference") between two antenna arrays (labeled "Array 1" and "Array 2"). The graph 600 shows the phase over frequency of a receive waveform of each array. As shown, at a specific frequency (e.g., a center frequency of 28 GHZ), the PD may be equal to the phase difference (ΔØ) between the phase ($Ø_1$) of the waveform for Array 1 and the phase ($Ø_2$) of the waveform for Array 2. The TD may be equal to the difference between $\tau_1$ and $\tau_2$, where $\tau_1$ represents the slope of the receive waveform for Array 1 and $\tau_2$ represents the slope of the receive waveform for Array 2.

Figure 7:
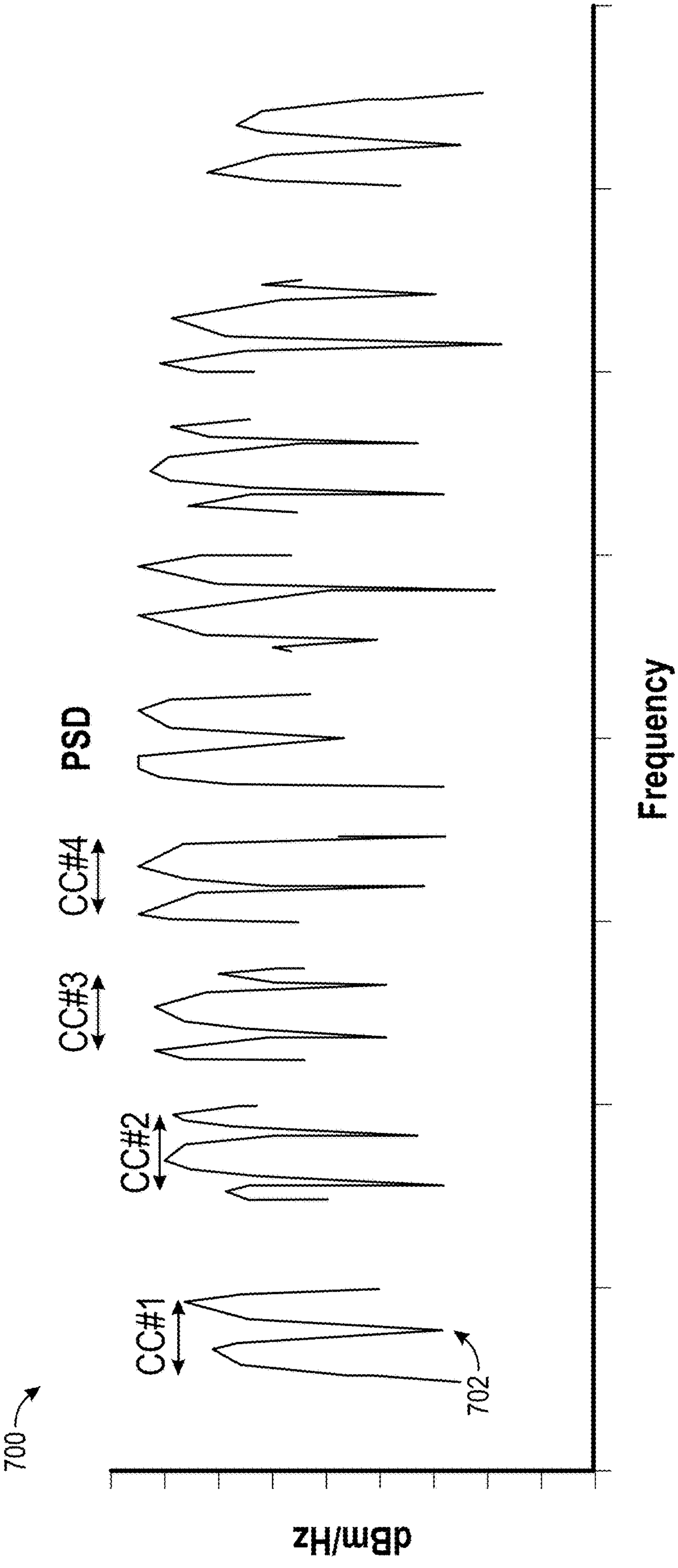
FIG. 7 is a graph illustrating a power spectral density (PSD) associated with transmissions via antenna arrays without calibration of phase delay and time delay.

FIG. 7 is a graph 700 illustrating a power spectral density (PSD) associated with transmissions via antenna arrays without calibration of phase delay and time delay. The graph 700 shows the PSD for multiple component carriers (CCs), such as CC #1, CC #2, and CC #3. Each CC may include peaks and nulls without alignment in phase and time delay, as shown. For instance, the receive waveform for CC #1 may include a null 702 as shown.

Figure 8:
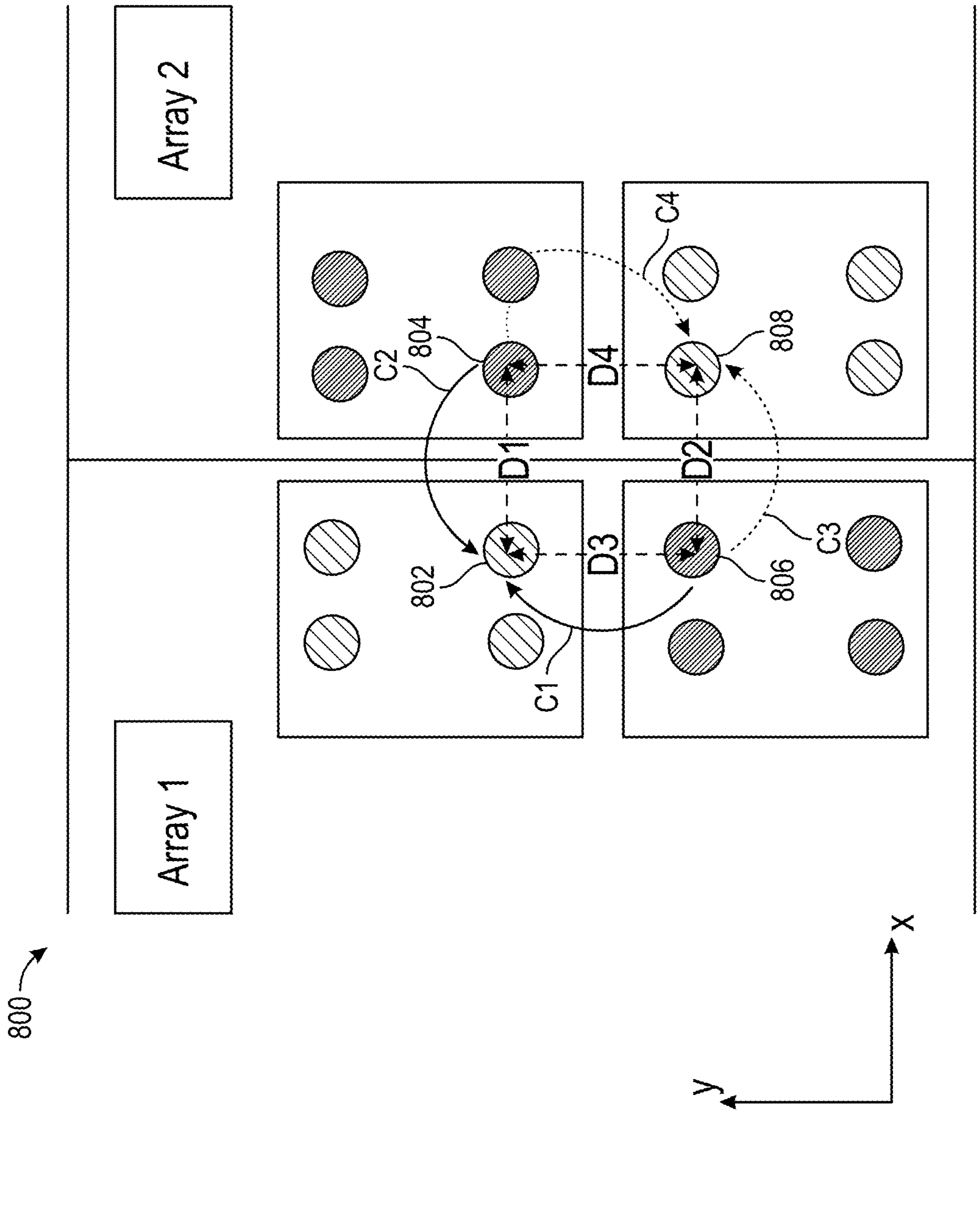
FIG. 8 illustrates mutual coupling between antennas of two arrays.

FIG. 8 illustrates the mutual coupling between antennas of two arrays (e.g., labeled "Array 1" and "Array 2"), in accordance with certain aspects of the present disclosure. To determine the TD, antennas of arrays may be selected for calibration using the antenna geometry or simulations. For example, antennas 802, 806 from Array 1 and antennas 804, 806 from Array 2 may be selected for calibration. As shown, the mutual coupling from antenna 806 to antenna 802 may be C1, the mutual coupling from antenna 804 to antenna 802 may be C2, the mutual coupling from antenna 806 to antenna 808 may be C3, and the mutual coupling from antenna 804 to antenna 808 may be C4. The antennas 802, 804, 806, 808 may be selected such that C2 minus C1 is equal to C3 minus C4 over a frequency band.

In some cases, the antennas may be selected based on the antenna geometry (e.g., based on distances between the antennas). For example, the antennas may be selected such that the distance (D1) in the x direction between antennas 802, 804 and the distance (D2) in the x direction between antennas 806, 808 are the same, and such that the distance (D3) in the y direction between antennas 802, 806 and the distance (D4) in the y direction between antennas 804, 808 are the same. In other words, the antennas that are placed at regular interval distances in the x and y directions may be selected. In some cases, simulations may be performed to identify antennas that satisfy the symmetry of C2 minus C1 being equal to C3 minus C4, as described.

Figure 9:
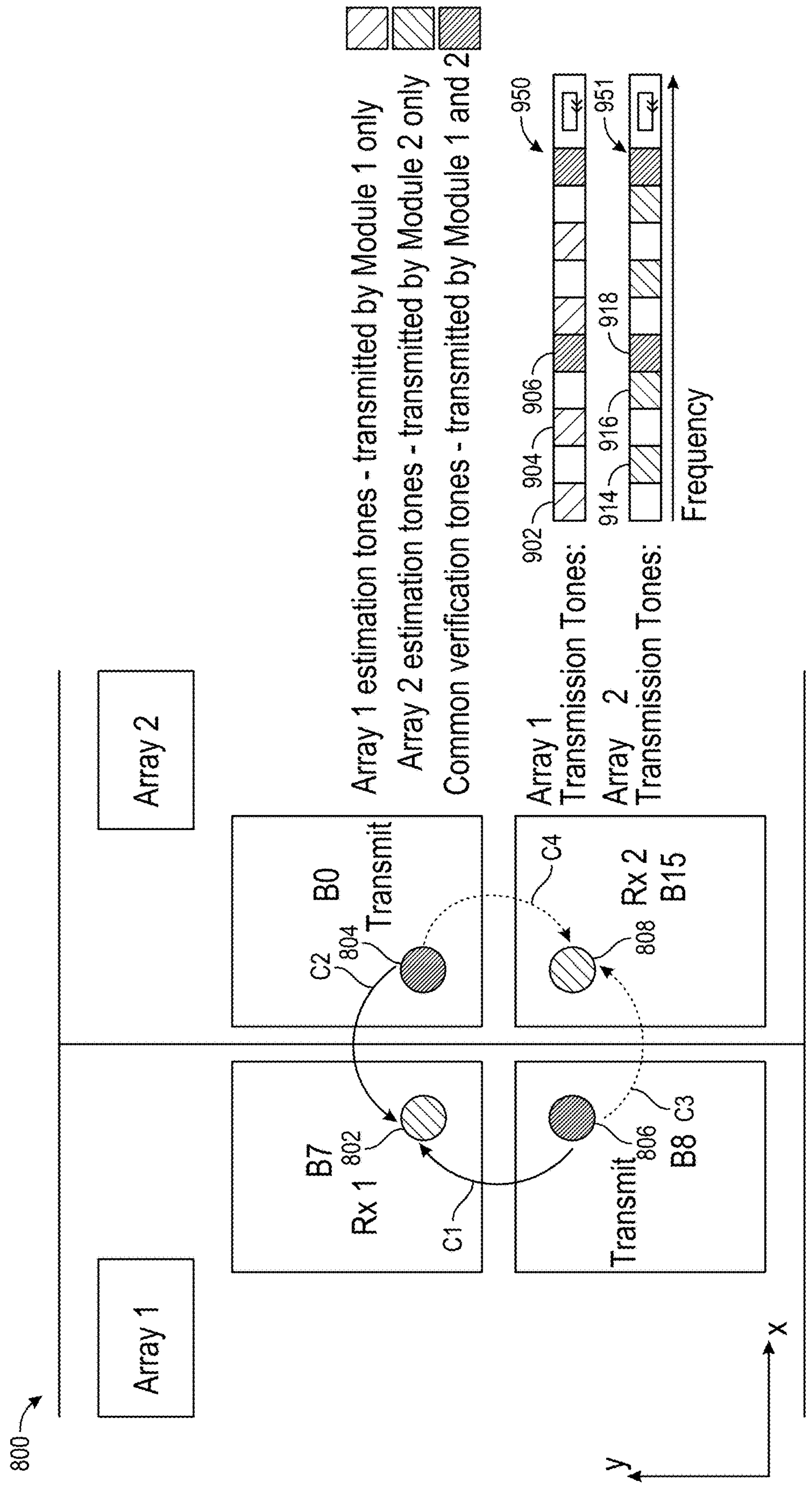
FIG. 9 illustrates transmit waveforms used to identify PD, in accordance with certain aspects of the present disclosure.

FIG. 9 illustrates transmit waveforms used to identify PD, in accordance with certain aspects of the present disclosure. In some aspects, a unique waveform may be transmitted from each array simultaneously. For example, a waveform 950 may be transmitted via a first array (Array 1) (e.g., via antenna 806 of Array 1), and a waveform 951 may be transmitted via a second array (Array 2) (e.g., via antenna 804 of Array 2), where waveforms 950 and 951 are different. Each waveform 950, 951 may include estimation tones for identifying one or more tuning parameters for calibration and verification tones for verifying the one or more tuning parameters. For example, Array 1 may transmit estimation tones 902, 904, and Array 2 may transmit estimation tones 914, 916, which may be used for computing the phase and timing correction. As used herein, any reference to phase and/or timing correction generally refers to a reduction of phase and timing offsets.

As shown, tone 902 may be transmitted via a first subcarrier, tone 904 may be transmitted via a second subcarrier adjacent to the first subcarrier, tone 906 may be transmitted via a third subcarrier adjacent to the second subcarrier, and so on. In some aspects, the tones (e.g., the estimation tones) may have equal frequency widths and may be spaced at equal intervals, such as every other 120 KHz band. Arrays 1 and 2 may transmit verification tones 906, 918 via the same subcarrier as shown. The verification tones 906, 918 may be used to measure the PSD of the final beamformed signal for verification after PD and/or TD correction is performed using the estimation tones. Array 1 may transmit the waveform 950 via antenna 806, and Array 2 may transmit the waveform 951 via antenna 804, simultaneously, while antenna 802 of Array 1 is used to receive the transmission. The receive waveform as received via antenna 802 of Array 1 may be demodulated to identify a first receiver measurement (Measurement Rx1) per equation:

$$C2 - C1 + PD(f) = \text{Measurement } Rx1$$

where PD(f) is the PD at a frequency (f) (e.g., the center frequency of 28 GHz shown in FIG. 6). As part of calibration, a phase offset may be applied to the digital chain of Array 1 and/or Array 2 to reduce the phase delay once determined. The same process may be performed with reception via antenna 808. For example, the waveforms 950, 951 may be simultaneously transmitted via antennas 804, 806 and received via antenna 808 of Array 2. The receive waveform as received via antenna 808 of Array 2 may be demodulated to identify a second receiver measurement (Measurement Rx2) per equation:

$$C3 - C4 - PD(f) = \text{Measurement } Rx2$$

Based on the selection of the antennas (e.g., using antenna geometry as described), the following expression may be realized:

$$C2 - C1 + PD(f) + C3 - C4 + PD(f) = \text{Measurement } Rx1 + \text{Measurement } Rx2$$

$$C2 - C1 = C3 - C4$$

$$PD(f) = (\text{Measurement } Rx1 + \text{Measurement } Rx2)/2$$

Thus, PD(f) may be determined and reduced using calibration, as described in more detail herein. Once PD(f) is determined and corrected by implementing a phase offset in the digital chains of Array 1 and Array 2, TD may be corrected in a similar manner.

The estimation and verification tones in waveforms 950, 951 are only examples and other waveforms (e.g., having more or fewer estimation tones and/or verification tones) may be used. Waveforms 950, 951 may be implemented using any suitable pattern of subcarriers or tones.

Figure 10:
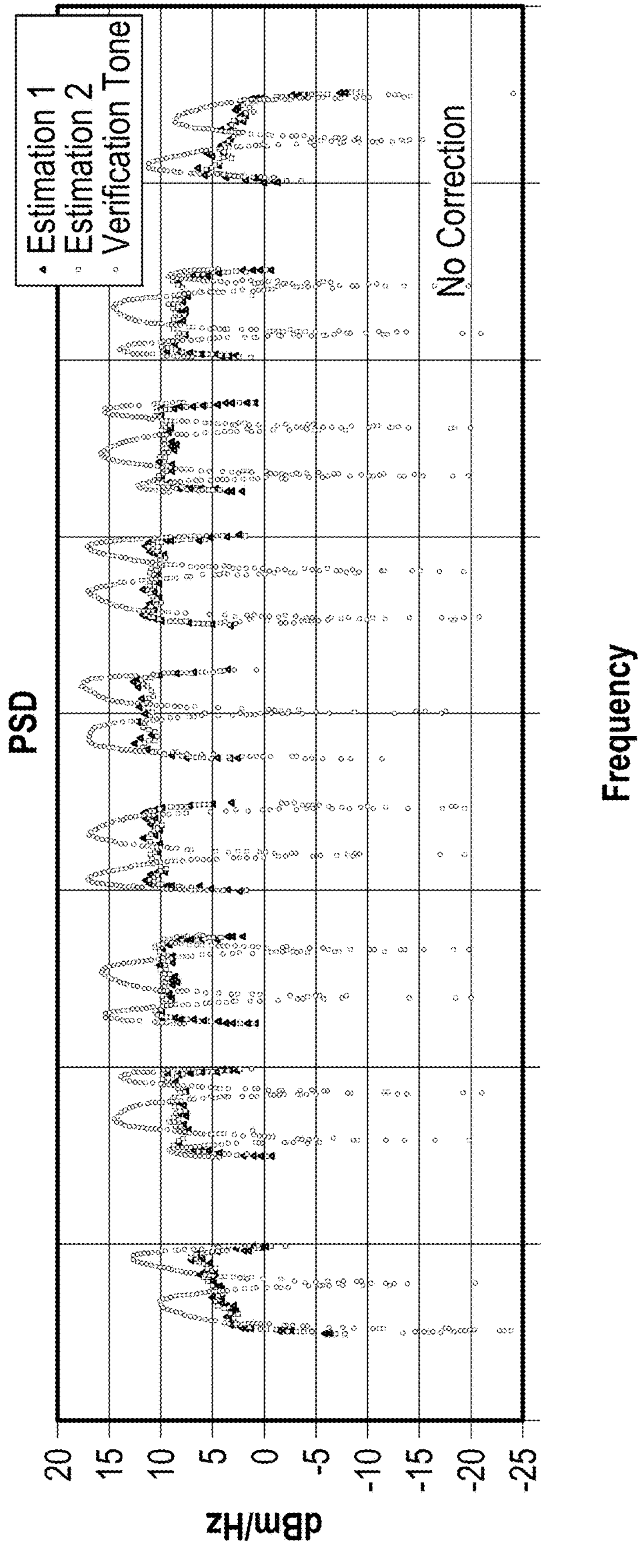
FIG. 10 is a graph illustrating a PSD of estimation tones and verification tones of receive waveforms before calibration.

FIG. 10 is graph 1000 illustrating a PSD of estimation tones and verification tones of receive waveforms as received via Array 1 and Array 2 before calibration (e.g., before correcting for PD and TD). As shown, the verification tones include peaks and nulls as described with respect to FIG. 7.

Figure 11B:
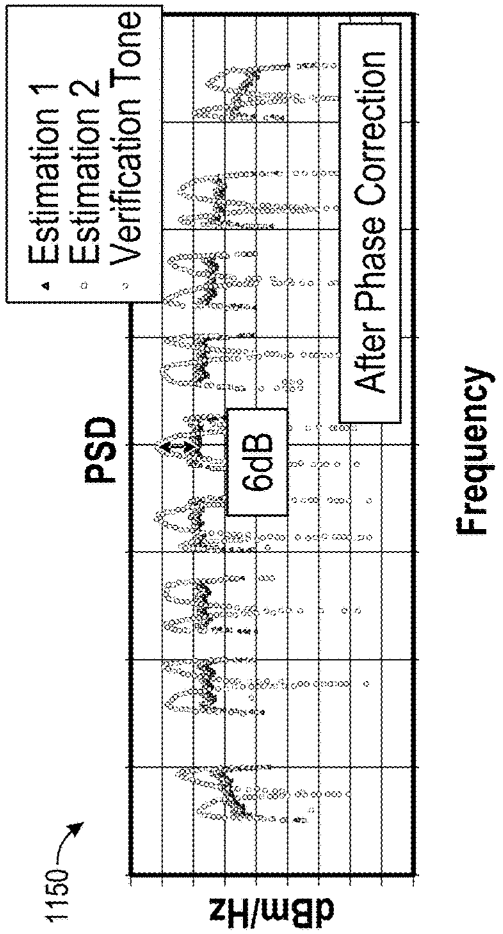
FIG. 11B is a graph illustrating a PSD of estimation tones and a verification tone after phase correction, in accordance with certain aspects of the present disclosure.
Figure 11A:
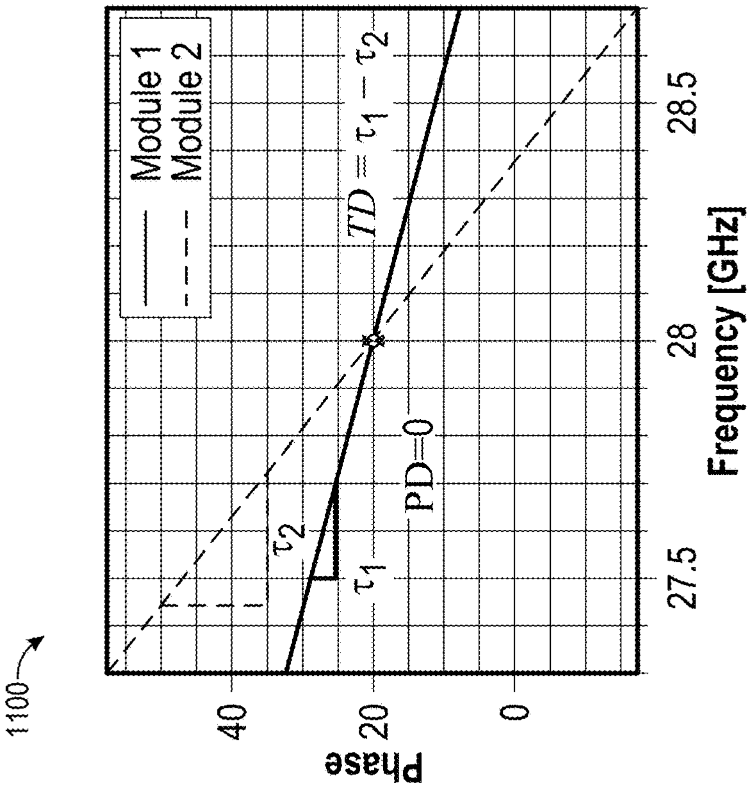
FIG. 11A is a graph illustrating TD and PD between estimation tones of receive waveforms after phase correction, in accordance with certain aspects of the present disclosure.

FIG. 11A is a graph 1100 illustrating TD and PD between estimation tones of receive waveforms as received via Arrays 1 and 2 after phase correction, in accordance with certain aspects of the present disclosure. As shown, the PD may be corrected to be zero (or at least reduced such that PD is less than a PD threshold) using the techniques described herein. Thus, at the center frequency (e.g., 28 GHz), the receive waveforms received via Array 1 and Array 2 may overlap.

FIG. 11B is a graph 1150 illustrating a PSD of estimation tones and a verification tone received via Array 1 and Array 2 after phase correction, in accordance with certain aspects of the present disclosure. As shown, after phase correction, the PSD of the verification tone at each component carrier may be 6 dB higher than the estimation tones. Once the phase correction has been performed, timing delay of the estimation tones received via Arrays 1 and 2 may be captured and corrected.

Figure 12A:
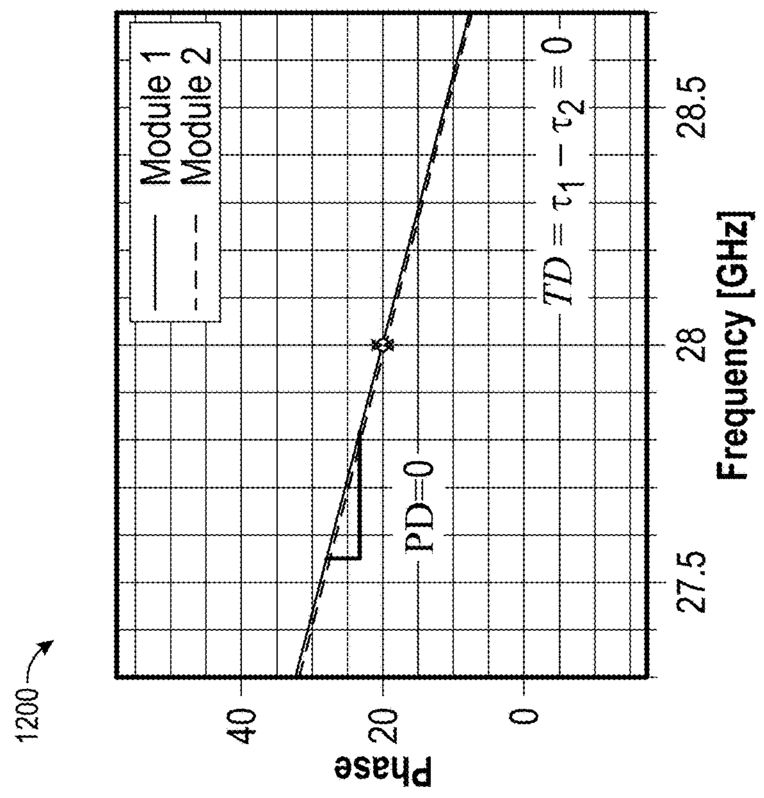
FIG. 12A is a graph illustrating TD and PD between estimation tones after timing and phase correction, in accordance with certain aspects of the present disclosure.

FIG. 12A is a graph 1200 illustrating TD and PD between Arrays 1 and 2 after timing correction, in accordance with certain aspects of the present disclosure. As shown, the TD may be corrected (or at least reduced) by setting the slopes $\tau_1$ and $\tau_2$ to be equal such that the TD ($\tau_1$ minus $\tau_2$) is equal to 0 (or at least less than a TD threshold).

Figure 12B:
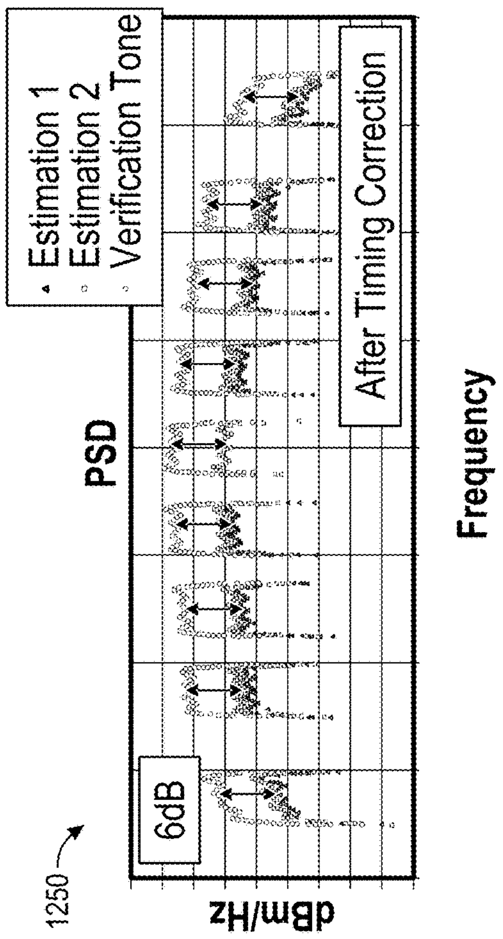
FIG. 12B is a graph illustrating a PSD of estimation tones and a verification tone after timing and phase correction, in accordance with certain aspects of the present disclosure.

FIG. 12B is a graph 1250 illustrating a PSD of estimation tones and a verification tone received via Arrays 1 and 2, in accordance with certain aspects of the present disclosure. As shown, the PSD of the verification tone at each component carrier may be 6 dB higher than the estimation tones. Moreover, with timing and phase correction being performed, the verification tone at each CC includes lower magnitude peaks. The verification tone at each CC in graph 1250 may not include a null as was present before phase and/or timing correction (e.g., as in graph 1150 of FIG. 11).

Figure 13:
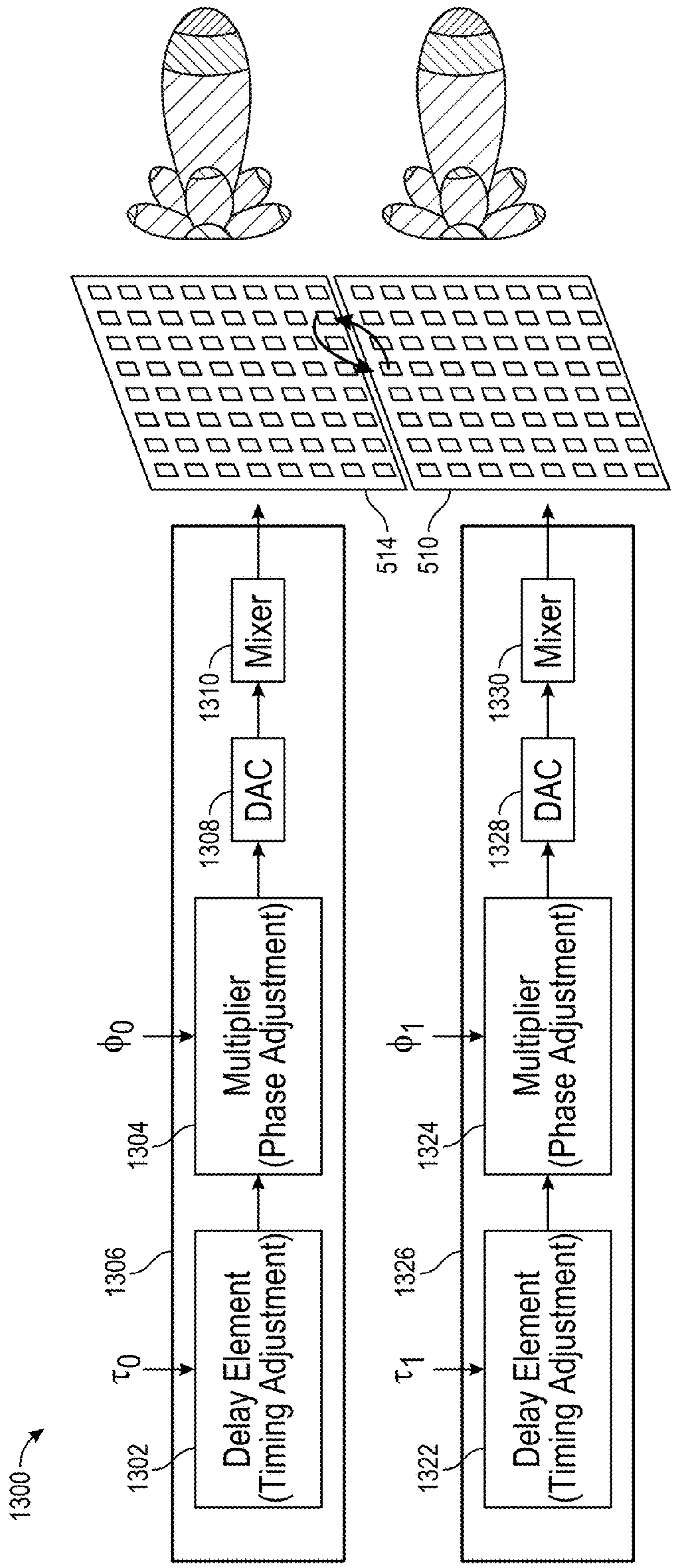
FIG. 13 illustrates a communication circuit which may include transceivers capable of timing and phase adjustment, in accordance with certain aspects of the present disclosure.

FIG. 13 illustrates a communication circuit 1300 which may include IFICs 1306, 1326 for timing and phase adjustment, in accordance with certain aspects of the present disclosure. For example, the IFIC 1306 may include a delay element 1302 for timing adjustment based on a timing parameter $\tau_0$ and a multiplier 1304 for phase adjustment based on a phase parameter $\emptyset_0$. A timing-and-phase-adjusted signal from the multiplier 1304 may be provided to a DAC 1308 for conversion from the digital domain to the analog domain. The analog signal from the DAC 1308 may be provided to a mixer 1310 for upconversion. The upconverted signal (or an amplified version thereof) may be used for transmission via array 514. Similarly, the IFIC 1326 may include a delay element 1322 for timing adjustment based on a timing parameter $\tau_1$ and a multiplier 1324 for phase adjustment based on a phase parameter $\emptyset_1$. A timing-and-phase-adjusted signal from the multiplier 1324 may be provided to a DAC 1328 for conversion from the digital domain to an analog domain. The analog signal from the DAC 1328 may be provided to a mixer 1330 for upconversion. The upconverted signal (or an amplified version thereof) may be used for transmission via array 510. Certain aspects are directed towards determining PD and TD using estimation tones and estimating $\tau_0$, $\tau_1$, $\phi_0$, $\phi_1$ that may be applied to perform the timing and phase adjustments for transmissions via arrays 510, 514, providing a narrow beam to improve signal-to-noise ratio (SNR) and transmit power towards a particular direction.

Figure 14:
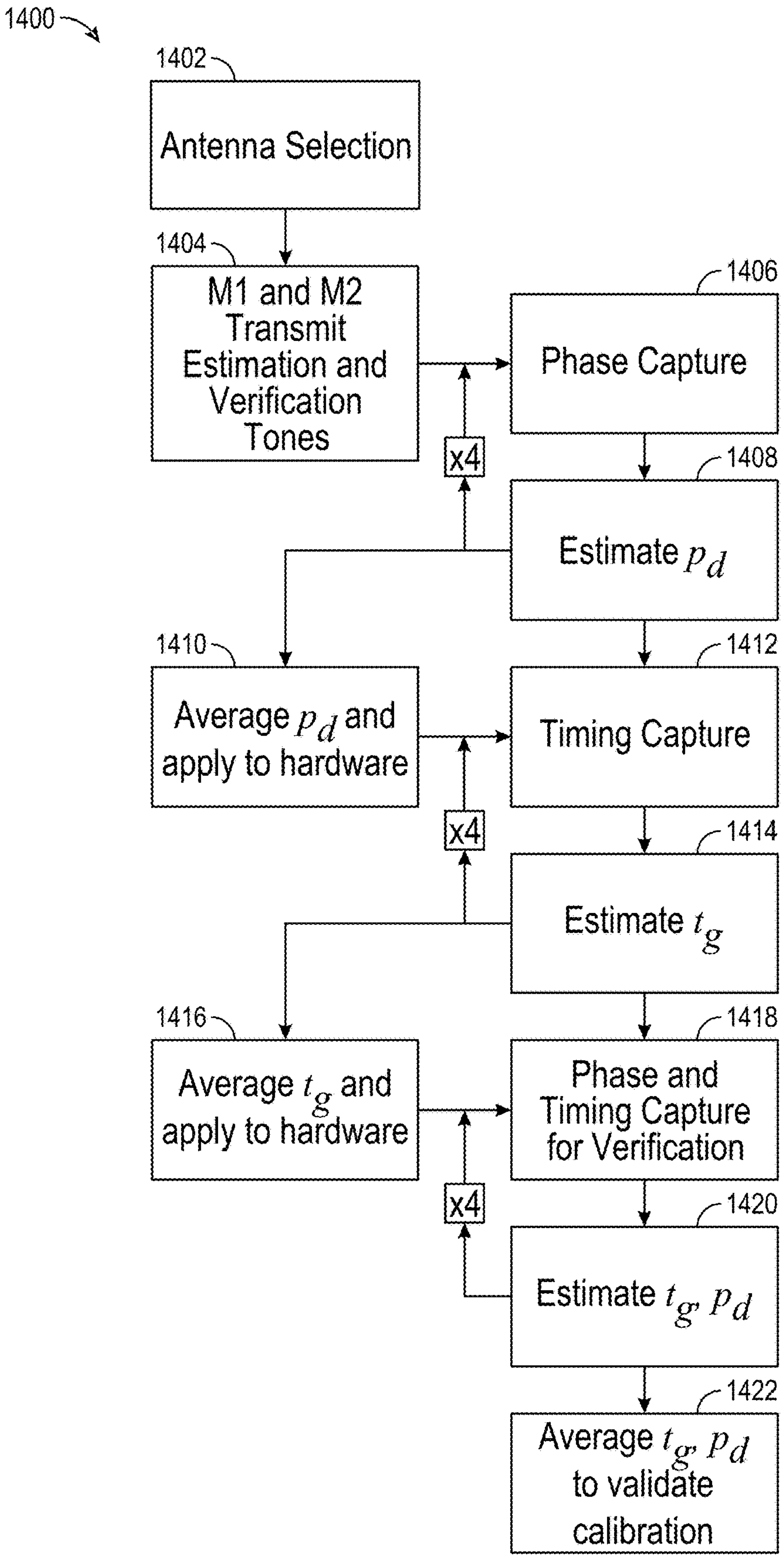
FIG. 14 is a flow diagram illustrating example operations for antenna calibration, in accordance with certain aspects of the present disclosure.

FIG. 14 is a flow diagram illustrating example operations 1400 for antenna calibration, in accordance with certain aspects of the present disclosure. The operations 1400 may be performed, for example, by a communication circuit such as the communication circuit 1300 of FIG. 13 and the antenna arrays 800 of FIG. 8, and a controller such as the controller 340 or controller 380 of FIG. 3.

At block 1402, the controller may perform antenna selection. For example, as described with respect to FIG. 8, antennas 802, 804, 806, 808 may be selected based on the distances between the antennas as described herein. At block 1404, Arrays 1 and 2 (e.g., labeled "M1" and "M2") may be used to transmit waveforms including estimation and verification tones using the selected antennas, as described herein. At block 1406, the phase associated with estimation tones of receive waveforms (e.g., received via antenna 802 and antenna 804 of FIG. 8) may be determined. For example, as described with respect to FIG. 6, the phase $\phi_1$ of the receive waveform received via antenna 802 of Array 1 and the phase $\phi_2$ of the receive waveform received via antenna 808 of Array 2 may be determined using the estimation tones. At block 1408, the phase delay (labeled "$p_d$" in FIG. 14) may be calculated based on the phase $\phi_1$ and the phase $\phi_2$. For example, as described with respect to FIG. 6, phase delay (PD) equal to the phase difference ($\Delta\varnothing$) between the phase ($\varnothing_1$) and the phase ($\varnothing_2$) may be determined. The operations at blocks 1406, 1408 may be repeated multiple times (e.g., four times, as indicated by the block labeled "x4") to derive multiple phase delays, which may be averaged at block 1410 and applied to hardware (e.g., used to set the phase adjustment applied via multipliers 1304, 1324 as described with respect to FIG. 13).

After phase correction, at block 1412, the phase-corrected waveforms may be transmitted simultaneously via antennas 804, 806, received via antennas 802, 808, and used to determine the timing of the receive waveforms. For example, as described with respect to FIG. 6, the slope $\tau_1$ of the waveform (e.g., phase-corrected waveform) received via Array 1 and the slope $\tau_2$ of the waveform (e.g., phase-corrected waveform) received via Array 2 may be determined using the estimation tones of the waveforms. At block 1414, the time delay (labeled "$t_g$" in FIG. 14) may be calculated based on the slope $\tau_1$ and the slope $\tau_2$. For example, as described with respect to FIG. 6, time delay (TD) equal to the difference between the slope ($\tau_1$) of the waveform received via Array 1 and the slope ($\tau_2$) of the waveform received Array 2 may be calculated. The operations at blocks 1412, 1414 may be repeated multiple times (e.g., four times) to derive multiple time delays, which may be averaged at block 1416 and applied to hardware (e.g., used to set the delay of delay elements 1302, 1322). At block 1418, phase and timing may be captured using verification tones and used to estimate, at block 1420, the time delay $t_g$ and the phase delay $p_d$ for verification. The operations at block 1418, 1420 may be performed multiple times (e.g., four times) to derive multiple time delays and phase delays and averaged, at block 1422, to derive an average time delay and an average phase delay for verification of calibration.

Figure 15:
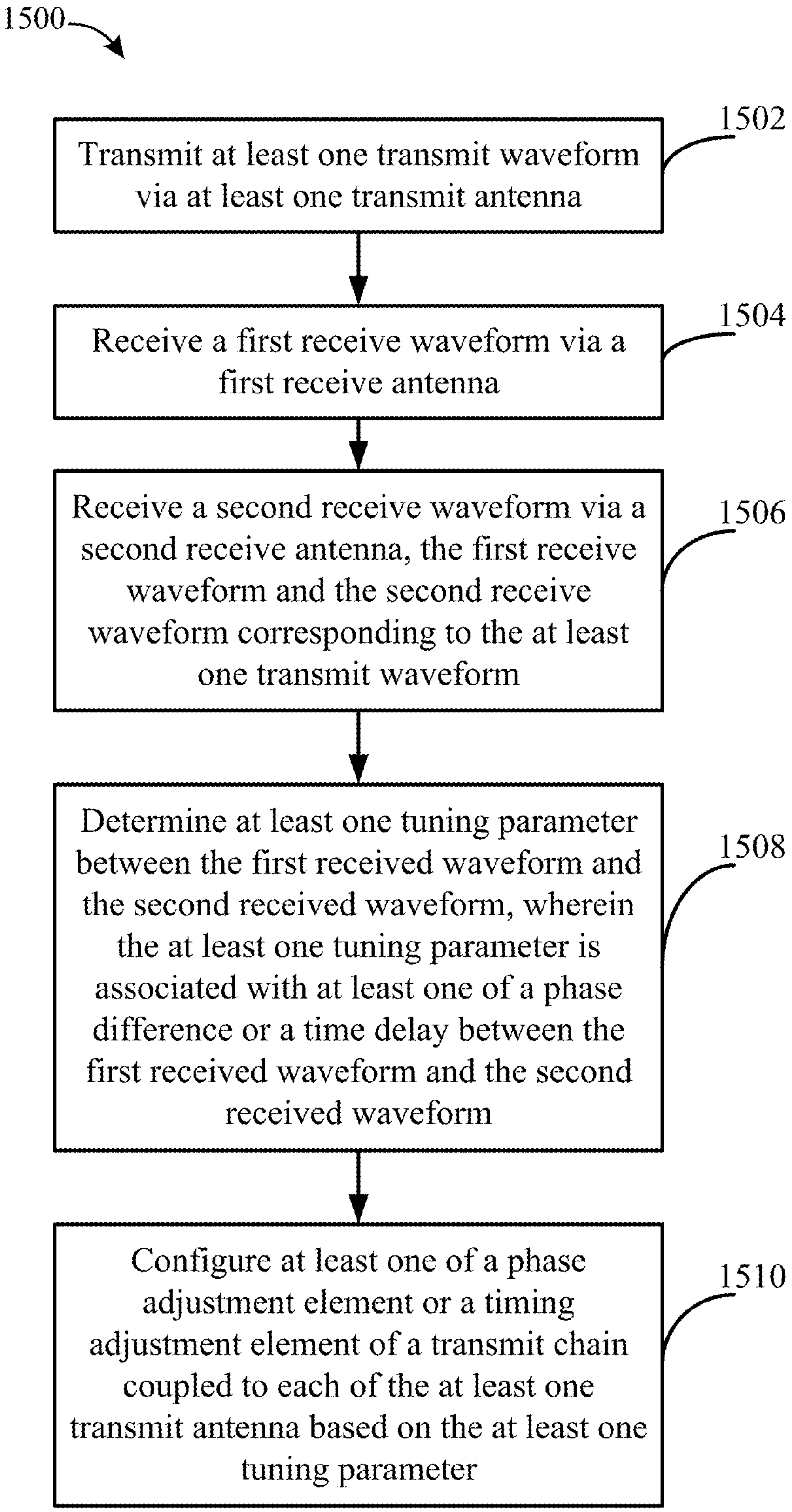
FIG. 15 is a flow diagram illustrating example operations for wireless communication, in accordance with certain aspects of the present disclosure.

FIG. 15 is a flow diagram illustrating example operations 1500 for wireless communication, in accordance with certain aspects of the present disclosure. The operations 1500 may be performed, for example, by a communication circuit such as the communication circuit 500 or a controller such as the controller 340 or controller 380.

At block 1502, the communication circuit may transmit at least one transmit waveform (e.g., waveforms 950, 951) via at least one transmit antenna (e.g., antenna 804 and antenna 806). At block 1504, the communication circuit may receive a first receive waveform via a first receive antenna (e.g., antenna 802). At block 1506, the communication circuit may receive a second receive waveform via a second receive antenna (e.g., antenna 808). The first receive waveform and the second receive waveform may correspond to the at least one transmit waveform. The at least one transmit antenna, the first receive antenna, and the second receive antenna may be part of an antenna array for beamformed transmissions.

At block 1508, the communication circuit may determine at least one tuning parameter based on the first received waveform and the second received waveform. The at least one tuning parameter may be associated with at least one of a phase difference (e.g., also referred to as a phase delay (PD)) or a time delay between the first received waveform and the second received waveform. The at least one tuning parameter may be determined to reduce the at least one of the phase difference or the time delay.

At block 1510, the communication circuit may configure at least one of a phase adjustment element (e.g., multiplier 1304 and/or multiplier 1324) or a timing adjustment element (e.g., delay element 1302 and/or delay element 1322) of a transmit chain coupled to each of the at least one transmit antenna based on the at least one tuning parameter.

The at least one transmit antenna may include a first transmit antenna (e.g., antenna 804) and a second transmit antenna (e.g., antenna 806). The at least one transmit waveform may be transmitted simultaneously via the first transmit antenna and the second transmit antenna. The controller may select the first transmit antenna (e.g., antenna 804), the second transmit antenna (e.g., antenna 806), the first receive antenna (e.g., antenna 802), and the second receive antenna (e.g., antenna 808). The selection may be based on: a first distance between the first transmit antenna and the first receive antenna; a second distance between the second transmit antenna and the second receive antenna; a third distance between the first receive antenna and the second transmit antenna; and a fourth distance between the second receive antenna and the first transmit antenna. For example, the first transmit antenna, the second transmit antenna, the first receive antenna, and the second receive antenna may be selected such that the first distance is equal to the second distance and the third distance is equal to the fourth distance. In some cases, the selection may be based on a first mutual coupling (e.g., C1) between the second transmit antenna and the first receive antenna, a second mutual coupling (e.g., C2) between the first transmit antenna and the first receive antenna, a third mutual coupling (e.g., C3) between the second transmit antenna and the second receive antenna, and a fourth mutual coupling (e.g., C4) between the first transmit antenna and the second receive antenna. For example, the first transmit antenna, the second transmit antenna, the first receive antenna, and the second receive antenna are selected such that a difference between the first mutual coupling and the second mutual coupling is the same as a difference between the third mutual coupling and the fourth mutual coupling.

In some aspects, the at least one transmit waveform includes a first transmit waveform transmitted via the first transmit antenna and a second transmit waveform transmitted via the second transmit antenna. The first transmit waveform may include one or more first estimation tones (e.g., estimation tones 902, 904), and the second transmit waveform may include one or more second estimation tones (e.g., estimation tones 914, 916). The at least one tuning parameter may be determined based on the one or more first estimation tones and the one or more second estimation tones.

Determining the at least one tuning parameter includes determining the phase difference. Determining the phase difference may include determining a first phase (e.g., Ø1 described with respect to FIG. 6) at a frequency (e.g., a center frequency) associated with the first receive waveform using one or more tones of the first receive waveform corresponding to the one or more first estimation tones, determining a second phase (e.g., (e.g., $Ø_2$ described with respect to FIG. 6) at the frequency associated with the second receive waveform using one or more tones of the second receive waveform corresponding to the one or more second estimation tones, and calculating the phase difference based on a difference between the first phase and the second phase.

In some aspects, determining the at least one tuning parameter may include determining the time delay, and determining the time delay may include determining a first slope (e.g., $\tau_1$ described with respect to FIG. 6) associated with the first receive waveform using one or more tones of the first receive waveform corresponding to the one or more first estimation tones, determining a second slope (e.g., $\tau_2$ described with respect to FIG. 6) associated with the second receive waveform using one or more tones of the second receive waveform corresponding to the one or more second estimation tones, and calculating the time delay based on a difference between the first slope and the second slope.

The one or more first estimation tones may be transmitted on one or more first subcarriers, and the one or more second estimation tones may be transmitted on one or more second subcarriers different than the one or more first subcarriers. The one or more first subcarriers may be adjacent to the one or more second subcarriers.

In some aspects, the first transmit waveform may include a first verification tone (e.g., verification tone 906), and the second transmit waveform may include a second verification tone (e.g., verification tone 918). The controller may determine, based on the first verification tone and the second verification tone, at least one of: a phase difference between the first receive waveform and the second receive waveform for verification of the at least one tuning parameter, or a time delay between the first received waveform and the second received waveform for verification of the at least one tuning parameter. The first verification tone and the second verification tone may be transmitted on the same subcarrier via the first transmit antenna and the second transmit antenna, respectively.

In some aspects, determining the at least one tuning parameter may include determining the phase difference, and configuring the at least one of the phase adjustment element or the timing adjustment element may include configuring the phase adjustment element based on the determined phase difference. The communication circuit may transmit at least one other transmit waveform using the phase adjustment element as configured based on the determined phase difference. The communication circuit may receive a third receive waveform via the first receive antenna, and receive a fourth receive waveform via the second receive antenna, the third receive waveform and the fourth receive waveform corresponding to the at least one other transmit waveform. The controller may determine the time delay between the third receive waveform and the fourth receive waveform and configure the timing adjustment element based on the time delay. The at least one other transmit waveform may be the same as the at least one transmit waveform.

EXAMPLE ASPECTS

Implementation examples are described in the following numbered clauses:

Aspect 1: A method for wireless communication, comprising: transmitting at least one transmit waveform via at least one transmit antenna; receiving a first receive waveform via a first receive antenna; receiving a second receive waveform via a second receive antenna, the first receive waveform and the second receive waveform corresponding to the at least one transmit waveform; determining at least one tuning parameter based on the first received waveform and the second received waveform, wherein the at least one tuning parameter is associated with at least one of a phase difference or a time delay between the first received waveform and the second received waveform; and configuring at least one of a phase adjustment element or a timing adjustment element of a transmit chain coupled to each of the at least one transmit antenna based on the at least one tuning parameter.

Aspect 2: The method of Aspect 1, wherein the at least one tuning parameter is determined to reduce the at least one of the phase difference or the time delay.

Aspect 3: The method of Aspect 1 or 2, wherein the at least one transmit antenna comprises a first transmit antenna and a second transmit antenna, and wherein the at least one transmit waveform is transmitted simultaneously via the first transmit antenna and the second transmit antenna.

Aspect 4: The method of Aspect 3, further comprising selecting the first transmit antenna, the second transmit antenna, the first receive antenna, and the second receive antenna based on: a first distance between the first transmit antenna and the first receive antenna; a second distance between the second transmit antenna and the second receive antenna; a third distance between the first receive antenna and the second transmit antenna; and a fourth distance between the second receive antenna and the first transmit antenna.

Aspect 5: The method of Aspect 4, wherein the first transmit antenna, the second transmit antenna, the first receive antenna, and the second receive antenna are selected such that the first distance is equal to the second distance and the third distance is equal to the fourth distance.

Aspect 6: The method of Aspect 4 or 5, further comprising selecting the first transmit antenna, the second transmit antenna, the first receive antenna, and the second receive antenna based on: a first mutual coupling between the second transmit antenna and the first receive antenna; a second mutual coupling between the first transmit antenna and the first receive antenna; a third mutual coupling between the second transmit antenna and the second receive antenna; and a fourth mutual coupling between the first transmit antenna and the second receive antenna.

Aspect 7: The method according to any of Aspects 4-6, wherein the first transmit antenna, the second transmit antenna, the first receive antenna, and the second receive antenna are selected such that a difference between the first mutual coupling and the second mutual coupling is the same as a difference between the third mutual coupling and the fourth mutual coupling.

Aspect 8: The method according to any of Aspects 3-7, wherein the at least one transmit waveform comprises: a first transmit waveform transmitted via the first transmit antenna; and a second transmit waveform transmitted via the second transmit antenna.

Aspect 9: The method of Aspect 8, wherein: the first transmit waveform comprises one or more first estimation tones; the second transmit waveform comprises one or more second estimation tones; the second estimation tones are different from the first estimation tones; and the at least one tuning parameter is determined based on the one or more first estimation tones and the one or more second estimation tones.

Aspect 10: The method of Aspect 9, wherein determining at least one tuning parameter includes determining the phase difference, and wherein determining the phase difference comprises: determining a first phase at a frequency associated with the first receive waveform using one or more tones of the first receive waveform corresponding to the one or more first estimation tones; determining a second phase at the frequency associated with the second receive waveform using one or more tones of the second receive waveform corresponding to the one or more second estimation tones; and calculating the phase difference based on a difference between the first phase and the second phase.

Aspect 11: The method of Aspect 9 or 10, wherein determining at least one tuning parameter includes determining the time delay, and wherein determining the time delay comprises: determining a first slope associated with the first receive waveform using one or more tones of the first receive waveform corresponding to the one or more first estimation tones; determining a second slope associated with the second receive waveform using one or more tones of the second receive waveform corresponding to the one or more second estimation tones; and calculating the time delay based on a difference between the first slope and the second slope.

Aspect 12: The method according to any of Aspects 9-11, wherein the one or more first estimation tones are adjacent to the one or more second estimation tones.

Aspect 13: The method according to any of Aspects 9-12, wherein: the first transmit waveform comprises a first verification tone; the second transmit waveform comprises a second verification tone; and the method further comprises determining, based on the first verification tone and the second verification tone, at least one of: a phase difference between the first receive waveform and the second receive waveform for verification of the at least one tuning parameter; or a time delay between the first received waveform and the second received waveform for verification of the at least one tuning parameter.

Aspect 14: The method of Aspect 13, wherein the first verification tone and the second verification tone are transmitted on the same subcarrier via the first transmit antenna and the second transmit antenna, respectively.

Aspect 15: The method according to any of Aspects 1-14, wherein: determining the at least one tuning parameter comprises determining the phase difference; configuring the at least one of the phase adjustment element or the timing adjustment element comprises configuring the phase adjustment element based on the determined phase difference; and the method further comprises: transmitting at least one other transmit waveform using the phase adjustment element as configured based on the determined phase difference; receiving a third receive waveform via the first receive antenna; receiving a fourth receive waveform via the second receive antenna, the third receive waveform and the fourth receive waveform corresponding to the at least one other transmit waveform; determining the time delay between the third receive waveform and the fourth receive waveform; and configuring the timing adjustment element based on the time delay.

Aspect 16: The method of Aspect 15, wherein the at least one other transmit waveform is the same as the at least one transmit waveform.

Aspect 17: The method according to any of Aspects 1-16, wherein the at least one transmit antenna, the first receive antenna, and the second receive antenna are part of an antenna array for beamformed transmissions.

Aspect 18: The method according to any of Aspects 1-17, wherein the first receive antenna and the second receive antenna are disposed on different antenna arrays coupled to respective intermediate frequency transceiver integrated circuits.

Aspect 19: An apparatus for wireless communication, comprising: a memory; and one or more processors coupled to the memory and configured to: cause transmission of at least one transmit waveform via at least one transmit antenna; cause reception of a first receive waveform via a first receive antenna; cause reception of a second receive waveform via a second receive antenna, the first receive waveform and the second receive waveform corresponding to the at least one transmit waveform; determine at least one tuning parameter based on the first received waveform and the second received waveform, wherein the at least one tuning parameter is associated with at least one of a phase difference or a time delay between the first received waveform and the second received waveform; and configure at least one of a phase adjustment element or a timing adjustment element of a transmit chain coupled to each of the at least one transmit antenna based on the at least one tuning parameter.

Aspect 20: A non-transitory computer-readable medium having instructions stored thereon, that when executed by one or more processors, cause the one or more processors to: cause transmission of at least one transmit waveform via at least one transmit antenna; cause reception of a first receive waveform via a first receive antenna; cause reception of a second receive waveform via a second receive antenna, the first receive waveform and the second receive waveform corresponding to the at least one transmit waveform; determine at least one tuning parameter based on the first received waveform and the second received waveform, wherein the at least one tuning parameter is associated with at least one of a phase difference or a time delay between the first received waveform and the second received waveform; and configure at least one of a phase adjustment element or a timing adjustment element of a transmit chain coupled to each of the at least one transmit antenna based on the at least one tuning parameter.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an ASIC, or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication, comprising:

transmitting at least one transmit waveform via at least one transmit antenna;

receiving a first receive waveform via a first receive antenna;

receiving a second receive waveform via a second receive antenna, the first receive waveform and the second receive waveform corresponding to the at least one transmit waveform;

determining at least one tuning parameter based on the first received waveform and the second received waveform, wherein the at least one tuning parameter is associated with at least one of a phase difference or a time delay between the first received waveform and the second received waveform; and configuring at least one of a phase adjustment element or a timing adjustment element of a transmit chain coupled to each of the at least one transmit antenna based on the at least one tuning parameter, wherein the at least one transmit antenna comprises a first transmit antenna and a second transmit antenna and wherein the at least one transmit waveform is transmitted via the first transmit antenna and the second transmit antenna, wherein a first distance between the first transmit antenna and the first receive antenna is approximately equal to a second distance between the second transmit antenna and the second receive antenna, and wherein a third distance between the first receive antenna and the second transmit antenna is approximately equal to a fourth distance between the second receive antenna and the first transmit antenna.

2. The method of claim 1, wherein the at least one tuning parameter is determined to reduce the at least one of the phase difference or the time delay.

3. The method of claim 1, further comprising selecting the first transmit antenna, the second transmit antenna, the first receive antenna, and the second receive antenna based on:

a first mutual coupling between the second transmit antenna and the first receive antenna;

a second mutual coupling between the first transmit antenna and the first receive antenna;

a third mutual coupling between the second transmit antenna and the second receive antenna; and a fourth mutual coupling between the first transmit antenna and the second receive antenna.

4. The method of claim 3, wherein the first transmit antenna, the second transmit antenna, the first receive antenna, and the second receive antenna are selected such that a difference between the first mutual coupling and the second mutual coupling is the same as a difference between the third mutual coupling and the fourth mutual coupling.

5. The method of claim 1, wherein the at least one transmit waveform comprises:

a first transmit waveform transmitted via the first transmit antenna; and a second transmit waveform transmitted via the second transmit antenna.

6. The method of claim 5, wherein:

the first transmit waveform comprises one or more first estimation tones;

the second transmit waveform comprises one or more second estimation tones;

the second estimation tones are different from the first estimation tones; and the at least one tuning parameter is determined based on the one or more first estimation tones and the one or more second estimation tones.

7. The method of claim 6, wherein determining at least one tuning parameter includes determining the phase difference, and wherein determining the phase difference comprises:

determining a first phase at a frequency associated with the first receive waveform using one or more tones of the first receive waveform corresponding to the one or more first estimation tones;

determining a second phase at the frequency associated with the second receive waveform using one or more tones of the second receive waveform corresponding to the one or more second estimation tones; and calculating the phase difference based on a difference between the first phase and the second phase.

8. The method of claim 6, wherein determining at least one tuning parameter includes determining the time delay, and wherein determining the time delay comprises:

determining a first slope associated with the first receive waveform using one or more tones of the first receive waveform corresponding to the one or more first estimation tones;

determining a second slope associated with the second receive waveform using one or more tones of the second receive waveform corresponding to the one or more second estimation tones; and calculating the time delay based on a difference between the first slope and the second slope.

9. The method of claim 6, wherein the one or more first estimation tones are adjacent to the one or more second estimation tones.

10. The method of claim 6, wherein:

the first transmit waveform comprises a first verification tone;

the second transmit waveform comprises a second verification tone; and the method further comprises determining, based on the first verification tone and the second verification tone, at least one of:

a phase difference between the first receive waveform and the second receive waveform for verification of the at least one tuning parameter; or a time delay between the first received waveform and the second received waveform for verification of the at least one tuning parameter.

11. The method of claim 10, wherein the first verification tone and the second verification tone are transmitted on a same subcarrier via the first transmit antenna and the second transmit antenna, respectively.

12. The method of claim 1, wherein:

determining the at least one tuning parameter comprises determining the phase difference;

configuring the at least one of the phase adjustment element or the timing adjustment element comprises configuring the phase adjustment element based on the determined phase difference; and the method further comprises:

transmitting at least one other transmit waveform using the phase adjustment element as configured based on the determined phase difference;

receiving a third receive waveform via the first receive antenna;

receiving a fourth receive waveform via the second receive antenna, the third receive waveform and the fourth receive waveform corresponding to the at least one other transmit waveform;

determining the time delay between the third receive waveform and the fourth receive waveform; and configuring the timing adjustment element based on the time delay.

13. The method of claim 12, wherein the at least one other transmit waveform is the same as the at least one transmit waveform.

14. The method of claim 1, wherein the at least one transmit antenna, the first receive antenna, and the second receive antenna are part of an antenna array for beamformed transmissions.

15. The method of claim 1, wherein the first receive antenna and the second receive antenna are disposed on different antenna arrays coupled to respective intermediate frequency transceiver integrated circuits.

16. An apparatus for wireless communication, comprising:

a memory; and one or more processors coupled to the memory and configured to:

cause transmission of at least one transmit waveform via at least one transmit antenna;

cause reception of a first receive waveform via a first receive antenna;

cause reception of a second receive waveform via a second receive antenna, the first receive waveform and the second receive waveform corresponding to the at least one transmit waveform;

determine at least one tuning parameter based on the first received waveform and the second received waveform, wherein the at least one tuning parameter is associated with at least one of a phase difference or a time delay between the first received waveform and the second received waveform; and configure at least one of a phase adjustment element or a timing adjustment element of a transmit chain coupled to each of the at least one transmit antenna based on the at least one tuning parameter, wherein the at least one transmit antenna comprises a first transmit antenna and a second transmit antenna and wherein the one or more processors are configured to cause transmission of the at least one transmit waveform via the first transmit antenna and the second transmit antenna, wherein a first distance between the first transmit antenna and the first receive antenna is approximately equal to a second distance between the second transmit antenna and the second receive antenna, and wherein a third distance between the first receive antenna and the second transmit antenna is approximately equal to a fourth distance between the second receive antenna and the first transmit antenna.

17. A non-transitory computer-readable medium having instructions stored thereon, that when executed by one or more processors, cause the one or more processors to:

cause transmission of at least one transmit waveform via at least one transmit antenna;

cause reception of a first receive waveform via a first receive antenna;

cause reception of a second receive waveform via a second receive antenna, the first receive waveform and the second receive waveform corresponding to the at least one transmit waveform;

determine at least one tuning parameter based on the first received waveform and the second received waveform, wherein the at least one tuning parameter is associated with at least one of a phase difference or a time delay between the first received waveform and the second received waveform; and configure at least one of a phase adjustment element or a timing adjustment element of a transmit chain coupled to each of the at least one transmit antenna based on the at least one tuning parameter, wherein the at least one transmit antenna comprises a first transmit antenna and a second transmit antenna and wherein the instructions, when executed by the one or more processors, cause the one or more processors to cause transmission of the at least one transmit waveform via the first transmit antenna and the second transmit antenna, wherein a first distance between the first transmit antenna and the first receive antenna is approximately equal to a second distance between the second transmit antenna and the second receive antenna, and wherein a third distance between the first receive antenna and the second transmit antenna is approximately equal to a fourth distance between the second receive antenna and the first transmit antenna.

* * * * *